Oct. 17, 1950  P. G. LARKIN  2,526,244
LIQUID COOLING DEVICE
Filed Jan. 24, 1947

INVENTOR.
PETER G. LARKIN,
BY
ATTORNEYS.

Patented Oct. 17, 1950

2,526,244

UNITED STATES PATENT OFFICE 2,526,244

LIQUID COOLING DEVICE

Peter G. Larkin, New York, N. Y.

Application January 24, 1947, Serial No. 724,155

2 Claims. (Cl. 62—142)

1

This invention relates to a cooling device, and more particularly to a cooling device for beer or similar liquids.

A primary object of this invention is the provision of an improved cooling box or receptacle provided with coils through which beer may be passed for the purpose of cooling the same.

An additional object of the invention is the provision of a coil providing a relatively tortuous path through a cooling medium, as an ice chest, through which beer slowly passes to a faucet for drawing the same off.

A further object of the invention is the provision of such a device characterized by means for agitating the ice or similar refrigerant therein, thus enhancing the cooling properties thereof.

Still other objects reside in the combinations of elements, arrangements of parts, and features of construction, all as will be more fully pointed out hereinafter and shown in accompanying drawings, wherein there is disclosed a preferred embodiment of this inventive concept.

It is well known that beer, whether warm or cold, tends to throw off its gases. It is also well known that beer in an air-tight container cannot give up its gases whether in bottles or beer kegs. It has been found that beer placed under twenty-five pounds pressure to the square inch will remain liquid in the kegs and coils and not readily give up its gases.

If, through the medium of an electric air pump delivering twenty-five pounds of compressed air to the square inch, this pressure is introduced to the beer keg when being tapped, it will cause the beer to be retained in a solid stream as it passes through the tapping valve, and the nozzle spray or foaming feature eliminated while in the coil, and so on through the coil to the bar and faucet. With a proper cooling medium and an efficient refrigeration box and coils, the beer may be drawn in a solid stream at a uniform temperature with practically no waste. It is also a common fact that heat will not injure beer if the carbonic gases are kept in it by a tight container, and ice will not preserve beer if the container is leaking and the gases are allowed to escape.

Breweries deliver truck-loads of beer under exposure to the warm summer sun often pounding over the roughly paved streets, and much of it is not delivered until late in the afternoon, and many times the kegs or bottles become hot under the noonday sun, yet the beer is not injured because the gases are confined. The present invention, therefore, serves to permit the beer to be retained in a solid stream while flowing through the cooling equipment to the dispensing faucet.

In the drawings.

Similar reference characters refer to similar parts throughout the several views of the drawings.

Figure 1:
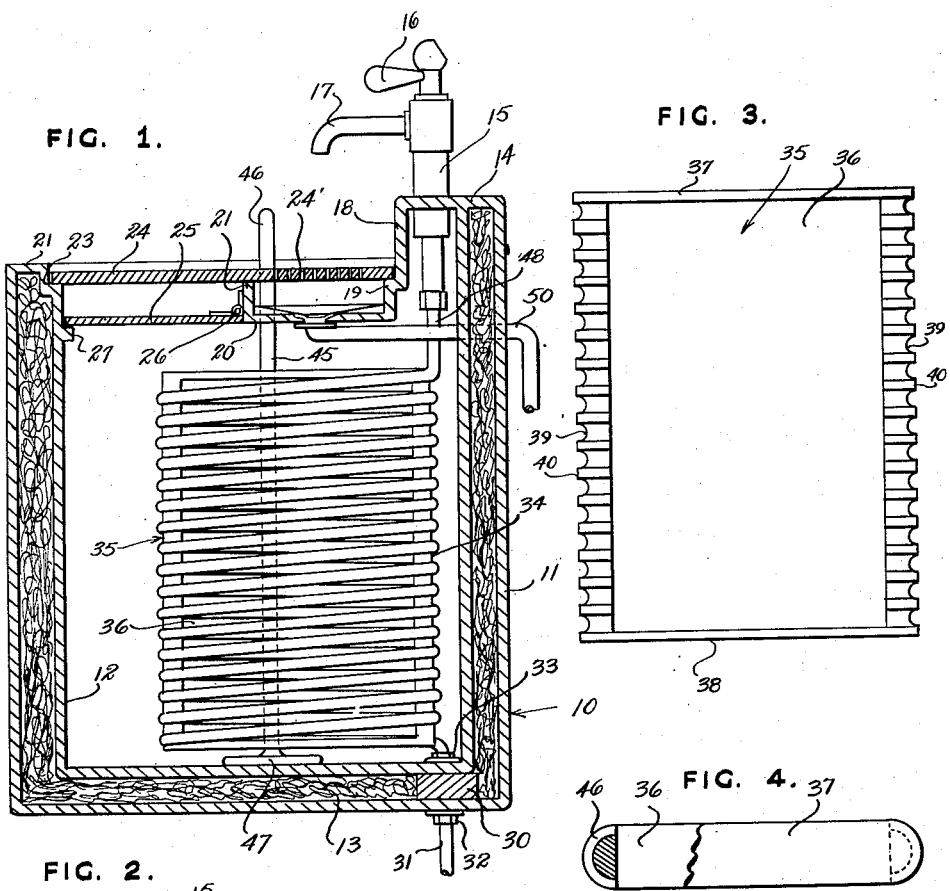
Figure 1 is a vertical sectional view taken substantially through the center line of one form of cooling receptacle embodying features of the instant invention.
Figure 3:
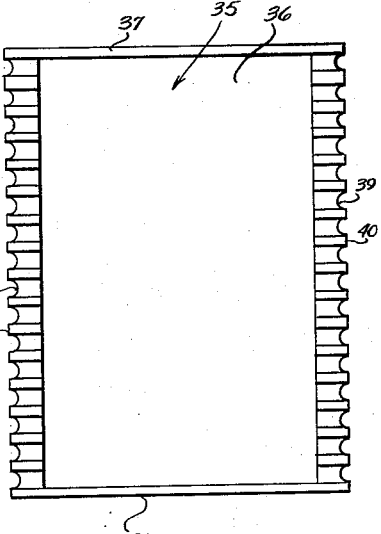
Figure 3 is a side elevational view of one of the supporting members for the cooling coils forming a feature of the instant invention.
Figure 4:
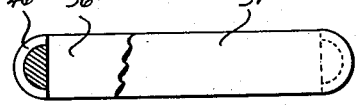
Figure 4 is a top view partially in plan and partially broken away of the construction shown in Figure 3.
Figure 2:
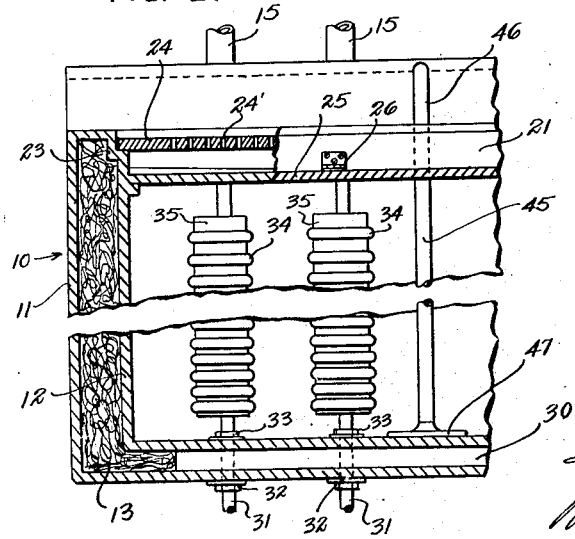
Figure 2 is a view partly in elevation and partly in section, taken substantially at right angles to Figure 1.

Referring now to the drawings, the device of the instant invention comprises a receptacle generally indicated at 10, including an outer wall 11 and an inner wall 12, the space therebetween being filled with suitable insulating material 13. At the rear of the device the inner and outer walls 11 and 12 terminate in a top plate 14, upon which is positioned a faucet 15 provided with an operating handle 16 and a spout 17, the faucet being of any desired conventional type.

The top plate 14 is provided with a depending flange 18, having an offset portion forming a ledge 19, and a forwardly extending plate 20 terminating in an upwardly extending flange 21.

The opposite walls 11 and 12 forming the opposite sides of the receptacle terminate in a top plate 22, while the inner wall is provided with an indentation 23, forming a seat for a plate 24, provided with drainage apertures 25, the opposite side of which seats on the ledge 19.

The plate 24 is removable, if desired, and access may be had to the interior of the receptacle 10 by means of a cover member 25, closing a suitable aperture, and hinged, as by hinges 26, to the flange 21. A ridge 27 formed on the inner wall 12 opposite the projection 21 serves as a support for the opposite side of the closure member 25.

An aluminum supporting bar, or bar of any other desired material, 30 is positioned in the base of the receptacle between the inner and outer walls, and is provided with apertures through which pass pipes 31, which lead from any desired receptacle or container for beer or similar liquid through suitable collars 32 and 33 exteriorly and interiorly of the receptacle, respectively, to a coil 34.

The coil 34, of which there may be any desired number in accordance with the number of faucets 15 provided for the receptacle, is positioned around a coil-supporting member 35, comprising a plate member 36 having top and bottom flanges 37 and 38, respectively, and a series of indentations 39 separated by ridges or flanges 40 extending along each edge thereof. The indentations 39 are of a diameter to accommodate tubing comprising the coil 34, and the coil 34 is wound about the associated plate in such manner that relatively sharp turns are provided at each end of the plate, while the relatively wide reach of the pipes along the side portions or plates 36 of the device provides a relatively great cooling area.

An agitator is provided for the stirring of the ice or similar refrigerant in the container, and takes the form of a rod 45 extending through suitable apertures in the plates 20 and 24, and terminates outwardly thereof in a handle 46. The lower portion of the member 45 is provided with a plate 47 providing a relatively large agitating surface.

An outlet connection 48 leads from the top of each coil 34 to its associated faucet, and a drainage plate 49 positioned on the member 23 communicates with a drainage pipe 50, leading to any desired receptacle, or the like.

From the foregoing, the method of use of the device should now be readily understandable. The receptacle 10 is suitably filled with ice or other desired refrigerating media by removal of the plate 24 and the lifting of the cover or closure member 25. The inlet pipe 31 may be suitably connected to a keg of beer, or the like, which is tapped in the conventional manner.

Obviously, upon opening the faucet 15, beer is drawn upwardly through the coil 34 and thence through the pipe 48 and outwardly through the spout 17. Any overflow passes through the aperture 24' into the drain 49 and thence outwardly through the drainage spout 50.

After the first glass has been drawn, the coil 34 will remain full, and such beer as is contained in the coil is thoroughly chilled, while additional beer passing through the coil to the faucet is rapidly cooled. The flow of the beer is relatively slow, due to the relatively low pitch of the coil, while the relatively large straight portion of the coil provides large areas for cooling.

Agitation of the ice by means of the agitating member 45 will effect an even distribution of the ice, thus increasing the cooling effect thereof.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

It will also be understood that any other suitable form of refrigeration, such as, for example, electro-mechanical, and any other form of agitation of the cooling medium, such as, for example, air bubbling through chilled water or brine, may be used in lieu of ice.

I claim:

1. A cooling device comprising a receptacle open at its top and having an insulated bottom wall and insulated side walls for the reception of a cooling medium, at least two elongated coils vertically disposed in said receptacle and spaced from each other and from said side walls, said coils each having an inlet depending from its lower end for introducing a liquid to be cooled therein and an outlet extending from its upper end for withdrawing the cooled liquid therefrom, an agitator vertically disposed intermediate one of said coils and the adjacent side wall of said receptacle and normally resting upon the bottom of the latter, said agitator being mounted for vertical movement and operable externally of said receptacle to circulate said cooling medium, and a removable top for closing the open end of said receptacle.

2. A cooling device comprising a receptacle open at its top and having an insulated bottom wall and insulated side walls for the reception of a cooling medium, at least two coil supporting members vertically disposed in said receptacle and spaced from each other and from said side walls, each of said coil supporting members having the exterior surface provided with a plurality of arcuate grooves arranged in superimposed relation therealong, a coil including a plurality of rings circumposed about each of said coil supporting members, the rings of each of said coils being received within the arcuate grooves of the respective one of said vertically disposed coil supporting members, said coils each having an inlet depending from its lower end for introducing a liquid to be cooled therein and an outlet extending from its upper end for withdrawing the cooled liquid therefrom, an agitator vertically disposed intermediate one of said coils and the adjacent side wall of said receptacle and normally resting upon the bottom of the latter, said agitator being mounted for vertical movement and operable externally of said receptacle to circulate said cooling medium, a removable top for closing the open end of said receptacle, and means disposed externally of said cover and operatively connected to the outlet of each coil for controlling the withdrawal of the cooled liquid.

PETER G. LARKIN.

REFERENCES CITED

The following references are of record in the file of this patent:

UNITED STATES PATENTS

| Number | Name | Date |
|---|---|---|
| 391,125 | Delphy | Oct. 16, 1888 |
| 949,216 | Canida | Feb. 15, 1910 |
| 1,029,981 | Fahrman | June 18, 1912 |
| 1,038,595 | Kalthoff | Sept. 17, 1912 |
| 2,088,376 | Kaskey | July 27, 1937 |
| 2,113,972 | Adams | Apr. 12, 1938 |

FOREIGN PATENTS

| Number | Country | Date |
|---|---|---|
| 75,441 | Germany | May 21, 1894 |